(12) United States Patent
Alex et al.

(10) Patent No.: US 6,756,714 B2
(45) Date of Patent: Jun. 29, 2004

(54) DUSTPROOF BEARING DEVICE FOR A MOTOR

(75) Inventors: Horng Alex, Kaohsiung (TW); Yin-Rong Hong, Kaohsiung (TW); Ching-Sheng Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 19 days.

(21) Appl. No.: 10/212,207

(22) Filed: Aug. 6, 2002

(65) Prior Publication Data

US 2004/0027017 A1 Feb. 12, 2004

(51) Int. Cl.[7] .......................... H02K 21/12; H02K 5/16; H02K 1/12
(52) U.S. Cl. .................. 310/90; 310/67 R; 310/90; 310/91; 384/279; 384/286
(58) Field of Search ........................... 384/279, 286; 310/90–91, 67 R, 254; H02K 5/00

(56) References Cited

U.S. PATENT DOCUMENTS

| | | | | |
|---|---|---|---|---|
| 5,245,236 A | * | 9/1993 | Horng | 310/67 R |
| 5,424,887 A | * | 6/1995 | Schuh | 360/97.03 |
| 5,679,997 A | * | 10/1997 | Matsuzawa et al. | 310/254 |
| 5,923,110 A | * | 7/1999 | Zhao et al. | 310/91 |
| 6,013,966 A | * | 1/2000 | Fehrenbacher et al. | 310/257 |
| 6,024,496 A | * | 2/2000 | Shy | 384/279 |
| 6,072,261 A | * | 6/2000 | Lin | 310/254 |
| 6,121,710 A | * | 9/2000 | Ho | 310/254 |
| 6,246,140 B1 | * | 6/2001 | Horng | 310/91 |
| 6,316,856 B1 | * | 11/2001 | Kusaki et al. | 310/90 |
| 6,320,291 B1 | * | 11/2001 | Lin et al. | 310/91 |
| 6,376,954 B1 | * | 4/2002 | Nunes, Jr. | 310/91 |
| 6,400,054 B1 | * | 6/2002 | Horng | 310/91 |
| 6,425,722 B1 | * | 7/2002 | Ueda et al. | 414/217 |
| 6,435,722 B1 | * | 8/2002 | Horng | 384/279 |
| 6,498,412 B2 | * | 12/2002 | Horng | 310/91 |

FOREIGN PATENT DOCUMENTS

| | | | | |
|---|---|---|---|---|
| GB | 0392739 | * | 10/1990 | H02K/5/167 |
| JP | 02184236 A | * | 7/1990 | H02K/5/16 |

OTHER PUBLICATIONS

U.S. patent application Publication, Horng A., Brushless DC Motor with Axial Winding/Axial Airgap, Oct. 17, 2003, (US2002/0149285).*

* cited by examiner

Primary Examiner—Tran Nguyen
Assistant Examiner—J. Aguirrechea
(74) Attorney, Agent, or Firm—Bacon & Thomas, PLLC

(57) ABSTRACT

A motor comprises an axle tube, a rotor, and a member. The axle tube includes a hole, and a stator is mounted to an outer periphery of the axle tube. The rotor includes an end wall having a shaft base from which a shaft extends. An annular wall extends from an inner face of the shaft base and surrounds the shaft. The member is mounted in the hole of the axle tube and rotatably receives the shaft of the rotor. The member includes a reduced section, forming a gap between the reduced section of the member and the axle tube. The annular wall extends into the gap between the reduced section of the member and the axle tube.

7 Claims, 7 Drawing Sheets

DUSTPROOF BEARING DEVICE FOR A MOTOR

BACKGROUND OF THE INVENTION

1. Field of the Invention

The present invention relates to a dustproof bearing device for a motor. In particular, the present invention relates to a dustproof bearing device that prevents entrance of dust and impurities into the bearing of the motor and that prevents loss of lubricating oil of the bearing.

2. Description of the Related Art

FIGS. 7 and 8 of the drawings illustrate a conventional bearing structure comprising an axle tube 90, an upper cap 91 tightly fitted in an upper end of the axle tube 90 and having a hole 911, a rotor having a shaft 92 extending through the hole 911 of the upper cap 91, and a connecting member 93 for retaining the upper cap 91 on the shaft 92. The connecting member 93 includes an annular wall 931 that extends beyond the hole 911 of the upper cap 91 and abuts against a shaft base 921 of the rotor. An oily bearing 94 is mounted around the shaft 92 and located below the connecting member 93. The oily bearing 94 is mounted in the hole 911 of the axle tube 90 in a non-tight engaging relationship. A lower cap 95 is mounted to a lower end of the axle tube 90, thereby limiting the oily bearing 94 between the upper cap 91 and the lower cap 95 for rotatably holding the shaft 92 of the rotor.

As illustrated in FIG. 8, since gaps exist between the annular wall 931 of the connecting member 93 and the hole 911 of the upper cap 91 and between the connecting member 93 and an inner periphery of the upper cap 91, dust and impurities are apt to enter the bearing 94 in the axle tube 90 through the gaps and thus accumulate between the bearing 94 and the shaft 92 of the rotor. As a result, the bearing 94 and the shaft 92 of the rotor are worn out rapidly.

FIG. 9 illustrates a heat-dissipating fan having a conventional dustproof structure. The fan includes an impeller 8 having a shaft 82 extending from an end wall thereof and a magnet 83 attached to a peripheral wall thereof. At least one set of concentrically arranged ribs 84 is provided on an inner face 81 of the end wall of the impeller 8. The ribs 84 are located at a level adjacent to an upper pole plate 86 of a stator 85, thereby forming a curved small gap between the ribs 84 and the upper pole plate 86. An axle tube 87 extends through the stator 85 and includes an upper end 870 close to the inner face 81 of the end wall of the impeller 8, thereby forming a curved small gap between the upper end 870 of the axle tube 87 and the inner face 81 of the end wall of the impeller 8. The configuration of the ribs 84 and the upper end 870 of the axle tube 87 increase the length of the path through which air flows, and the curved small gaps prevent dust from entering the shaft 82 when the impeller 8 turns. However, although it is difficult for the dust to enter the shaft 82, the dust may still enter the gap between the shaft 82 and the bearing 88 if the dust enters the axle tube 87. Further, the dustproof structure fails to prevent loss of the lubricating oil in the bearing 88.

SUMMARY OF THE INVENTION

An object of the present invention is to provide a dustproof bearing device for a motor, wherein dust and impurities are reliably prevented from entering the bearing, thereby lengthening the life of the bearing.

Another object of the present invention is to provide a dustproof bearing device for a motor, wherein loss of the lubricating oil contained in the oily bearing is prevented, thereby lengthening the life of the bearing.

A motor in accordance with the present invention comprises an axle tube, a rotor, and a member. The axle tube includes a hole, and a stator is mounted to an outer periphery of the axle tube. The rotor includes an end wall having a shaft base from which a shaft extends. An annular wall extends from an inner face of the shaft base and surrounds the shaft. The member is mounted in the hole of the axle tube and rotatably receives the shaft of the rotor. The member includes a reduced section, forming a gap between the reduced section of the member and the axle tube. The annular wall extends into the gap between the reduced section of the member and the axle tube.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
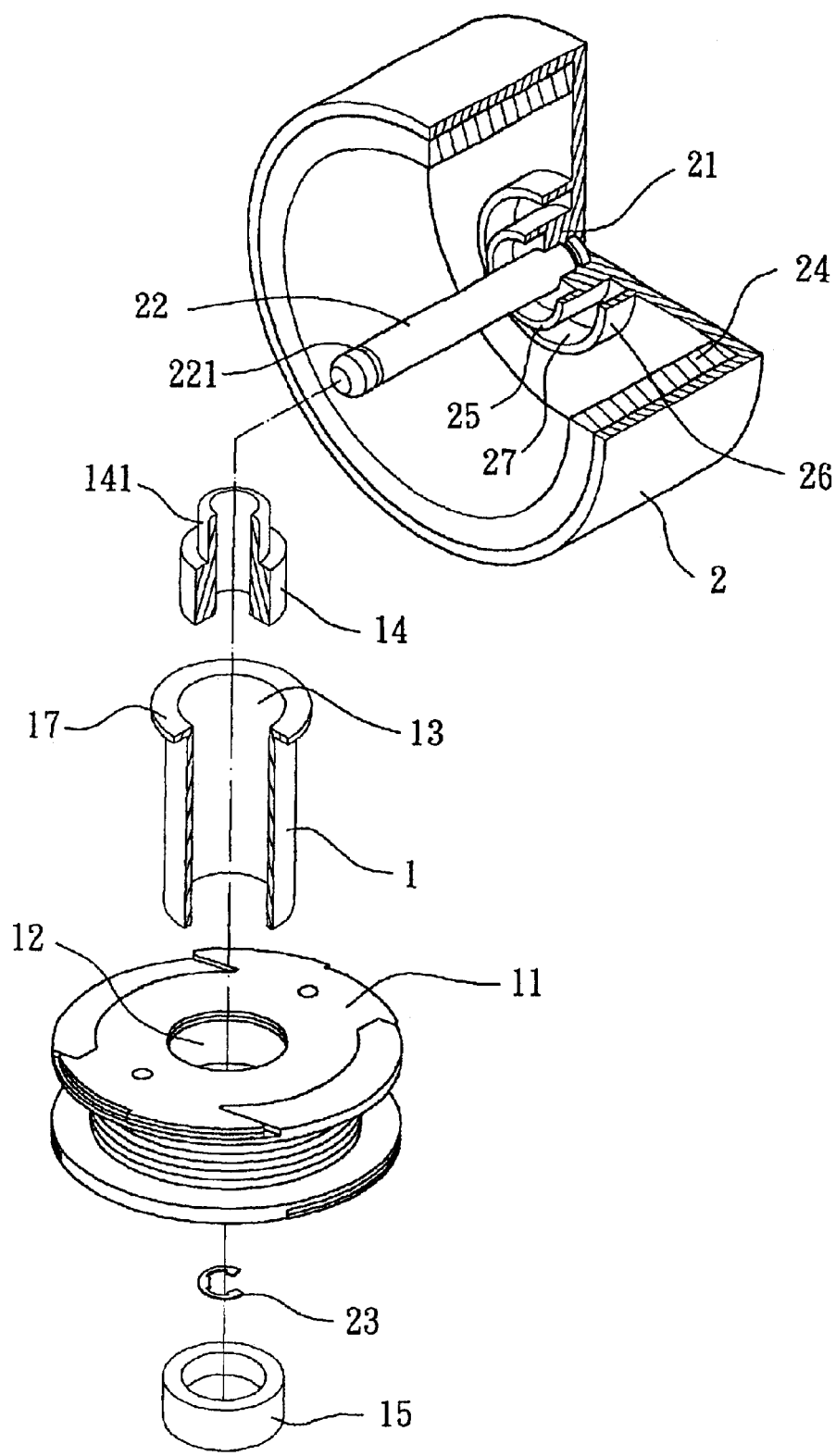
FIG. 1 is an exploded perspective view, partly cutaway, of a motor with a first embodiment of a dustproof bearing device in accordance with the present invention.

Referring to FIG. 1, a first embodiment of a dustproof bearing device for a motor in accordance with the present invention generally comprises an axle tube 1 and a rotor 2. The axle tube 1 is made of metal or directly formed by a base of a motor casing. The axle tube 1 extends through a hole 12 of a stator 11 and includes a hole 13 for receiving a bearing (e.g., an oily bearing 14) and a support 15. The oily bearing 14 and the support 15 are fixedly mounted in the hole 13 of the axle tube 1 in a tight engaging relationship. The oily bearing 14 may be a conventional copper bearing, a self-lubricating bearing, or a bearing containing lubricating oil. The oily bearing 14 includes a section having a diameter substantially the same as a diameter of the hole 13 of the axle tube 1. Further, the oily bearing 14 includes a reduced section 141 having a smaller diameter, forming a gap 16 between the reduced section 141 and an inner periphery defining the hole 13 of the axle tube 1. The gap 16 provides a space for storage of lubricating oil or accumulation of dust. A lower end of the axle tube 1 is closed by the support 15.

The rotor 2 includes a shaft base 21 in an end wall thereof and a permanent magnet 24 attached to an inner periphery of a peripheral wall thereof. A shaft 22 has an end fixed to the shaft base 21 and is rotatably received in the oily bearing 14. An annular groove 221 is defined in the other end of the shaft 22, and a retainer 23 (such as a C-clip) is mounted in the annular groove 221 for preventing disengagement of the rotor 2 from the oily bearing 14. The permanent magnet 24 is located around and spaced from the stator 11. An inner annular wall 25 extends from an outer periphery of the shaft base 21 of the rotor 2. An outer annular wall 26 extends from an inner face of the end wall of the rotor 2 and surrounds the inner annular wall 25, providing a compartment 27 between the inner annular wall 25 and the outer annular wall 26.

Figure 2:
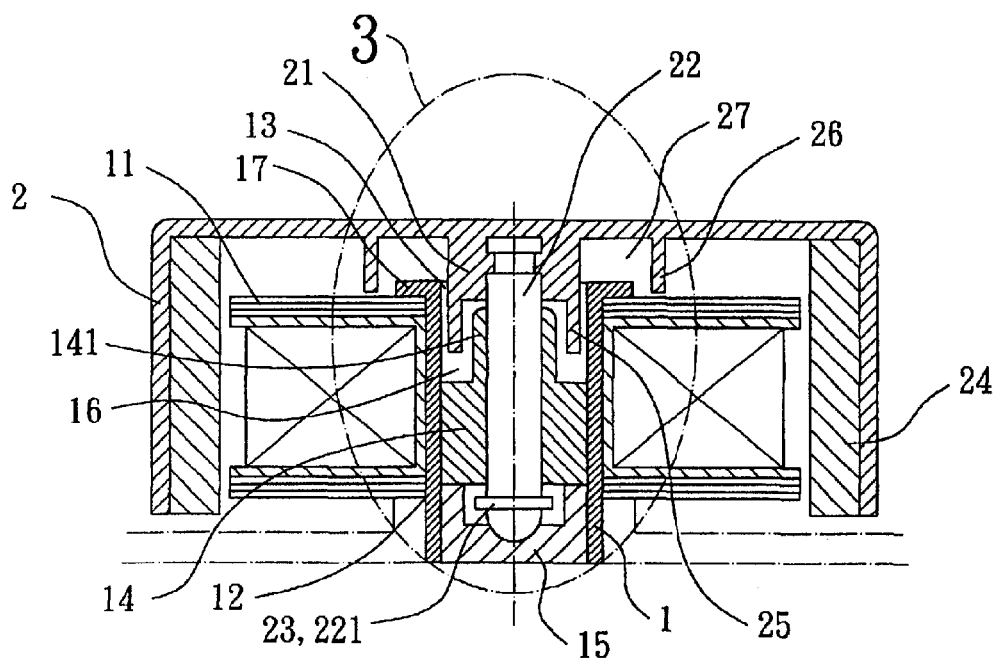
FIG. 2 is a sectional view of the motor in FIG. 1.
Figure 3:
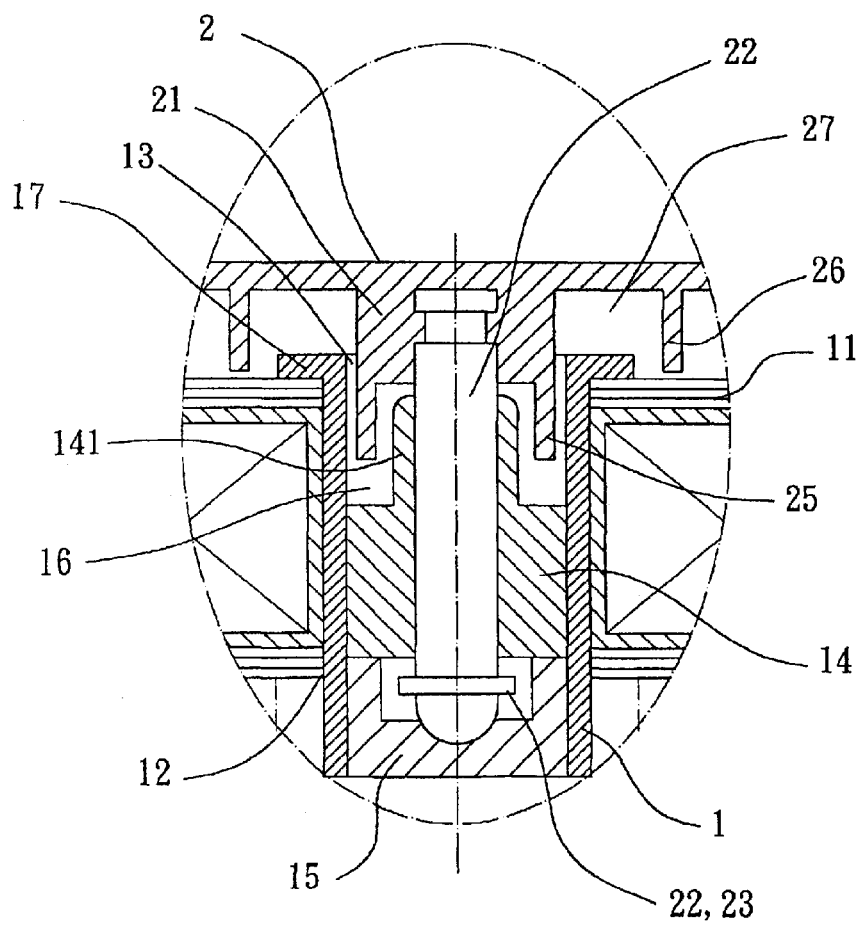
FIG. 3 is an enlarged view of a circled portion in FIG. 2.

Referring to FIGS. 2 and 3, in assembly, the stator 11 is mounted around the axle tube 1, and the oily bearing 14 is mounted in the hole 13 of the axle tube 1. The lower end of the axle tube 1 is closed by the support 15 with the shaft 22 of the rotor 2 being rotatably held by the oily bearing 14. The retainer 23 is engaged in the annular groove 221 of the shaft 22 with the distal end of the shaft 22 being rotatably supported by the support 15. The inner annular wall 25 of the rotor 2 extends into the gap 16 between the reduced section 141 of the oily bearing 14 and the axle tube 1. The outer annular wall 26 of the rotor 2 is located around the axle tube 1 and extends to a position adjacent to an upper side of the stator 11. In this embodiment, a flange 17 on an upper end of the axle tube 1 is located in the compartment 27 between the inner annular wall 25 and the outer annular wall 26.

By such an arrangement, dust or impurities could not enter the axle tube 1, as they would be blocked by the outer annular wall 26 of the rotor 2 and the flange 17 of the axle tube 1. Further, entrance of the dust or impurities is prevented by the arrangement of the inner annular wall 25 located in the gap 16 between the reduced section 141 of the oily bearing 14 and the axle tube 1. Even if the dust or impurities enter the axle tube 1 through the barrier of the outer annular wall 26 of the rotor 2, the flange 17 of the axle tube 1, and the inner annular wall 25 of the rotor 2, the dust or impurities can only be accumulated in the gap 16 between the reduced section 141 of the oily bearing 14 and the axle tube 1, rather than entering the space between the oily bearing 14 and the shaft 22. Further, the lubricating oil in the oily bearing released during rotation of the shaft 22 is blocked by the inner annular wall 25 and thus falls on the oily bearing 14 and then enters an interior of the oily bearing 14 through capillaries of the oil bearing 14. If necessary, a conventional lubricating oil passage may be provided in an outer periphery of the oily bearing 14 to allow flowing of the lubricating oil back to a space between a bottom of the oily bearing 14 and the support 15.

Figure 4:
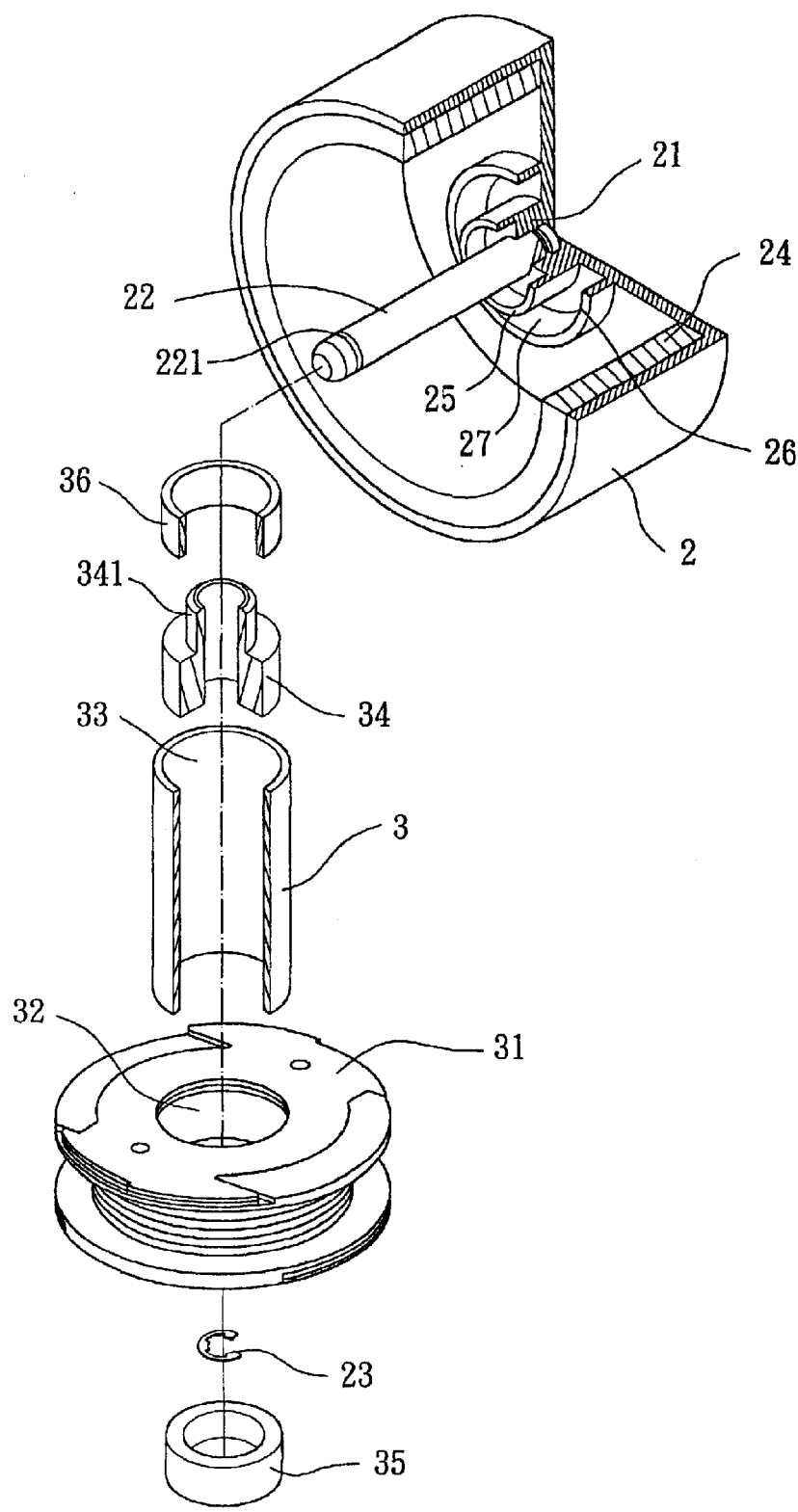
FIG. 4 is an exploded perspective view, partly cutaway, of a motor with a second embodiment of the dustproof bearing device in accordance with the present invention.

Referring to FIG. 4, a second embodiment of a dustproof bearing device for a motor in accordance with the present invention generally comprises an axle tube 3 and a rotor 2. The axle tube 3 is made of metal or directly formed by a base of a motor casing. The axle tube 3 extends through a hole 32 of a stator 31 and includes a hole 33 for receiving a bearing (e.g., an oily bearing 34), a support 35, and a retaining ring 36. The oily bearing 34 is mounted in the hole 33 of the axle tube 1 in a loose engaging relationship while the support 15 and the retaining ring 36 are fixedly mounted in the hole 33 of the axle tube 3 in a tight engaging relationship. The oily bearing 34 may be a conventional copper bearing, self-lubricating bearing, or a bearing containing lubricating oil. The oily bearing 34 includes a section having a diameter substantially the same as a diameter of the hole 33 of the axle tube 3. Further, the oily bearing 34 includes a reduced section 341 having a smaller diameter, forming a gap 37 between the reduced section 341 and the retaining ring 36. The gap 37 provides a space for storing lubricating oil or accumulation of dust. A lower end of the axle tube 3 is closed by the support 35, and the retaining ring 36 extends beyond an upper end of the axle tube 3.

Similar to the first embodiment, the rotor 2 includes a shaft base 21 in an end wall thereof and a permanent magnet 24 attached to an inner periphery of a peripheral wall thereof. A shaft 22 has an end fixed to the shaft base 21 and is rotatably received in the oily bearing 34. An annular groove 221 is defined in the other end of the shaft 22, and a retainer 23 (such as a C-clip) is mounted in the annular groove 221 for preventing disengagement of the rotor 2 from the oily bearing 34. The permanent magnet 24 is located around and spaced from the stator 31. An inner annular wall 25 extends from an outer periphery of the shaft base 21 of the rotor 2. An outer annular wall 26 extends from an inner face of the end wall of the rotor 2 and surrounds the inner annular wall 25, providing a compartment 27 between the inner annular wall 25 and the outer annular wall 26.

Figure 5:
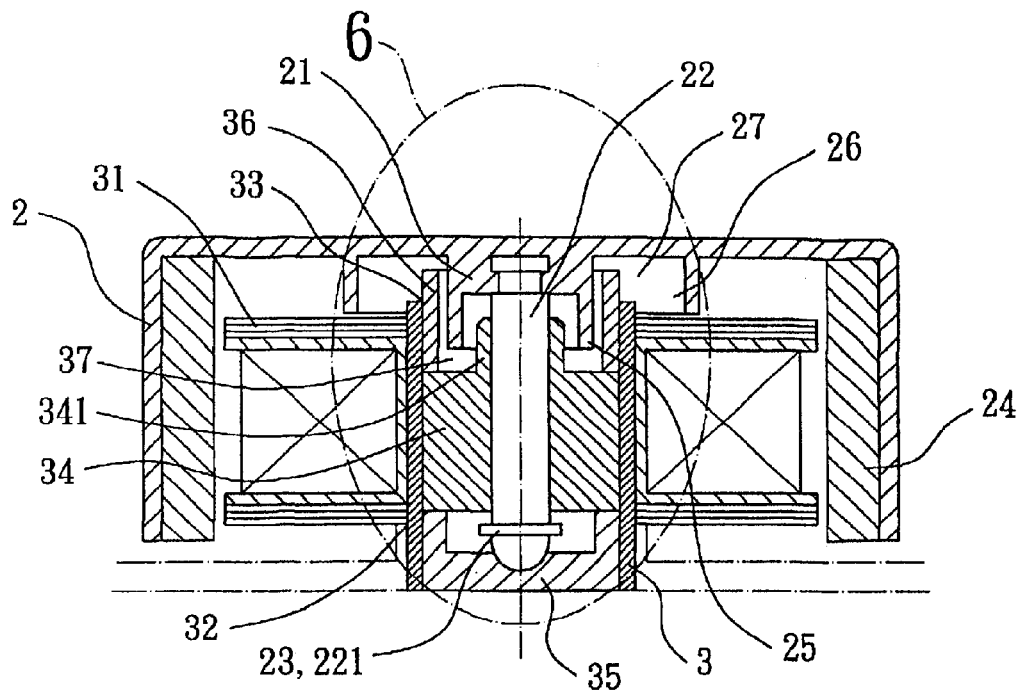
FIG. 5 is a sectional view of the motor in FIG. 4.
Figure 6:
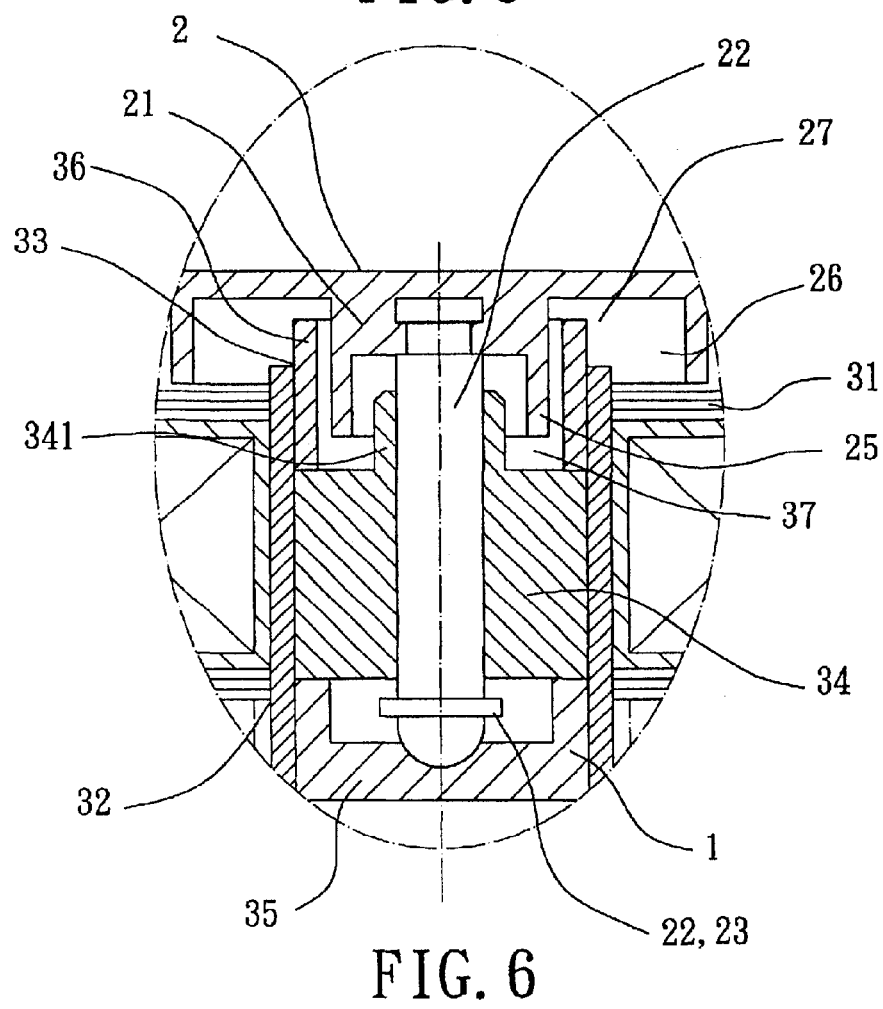
FIG. 6 is an enlarged view of a circled portion in FIG. 5.
Figure 7:
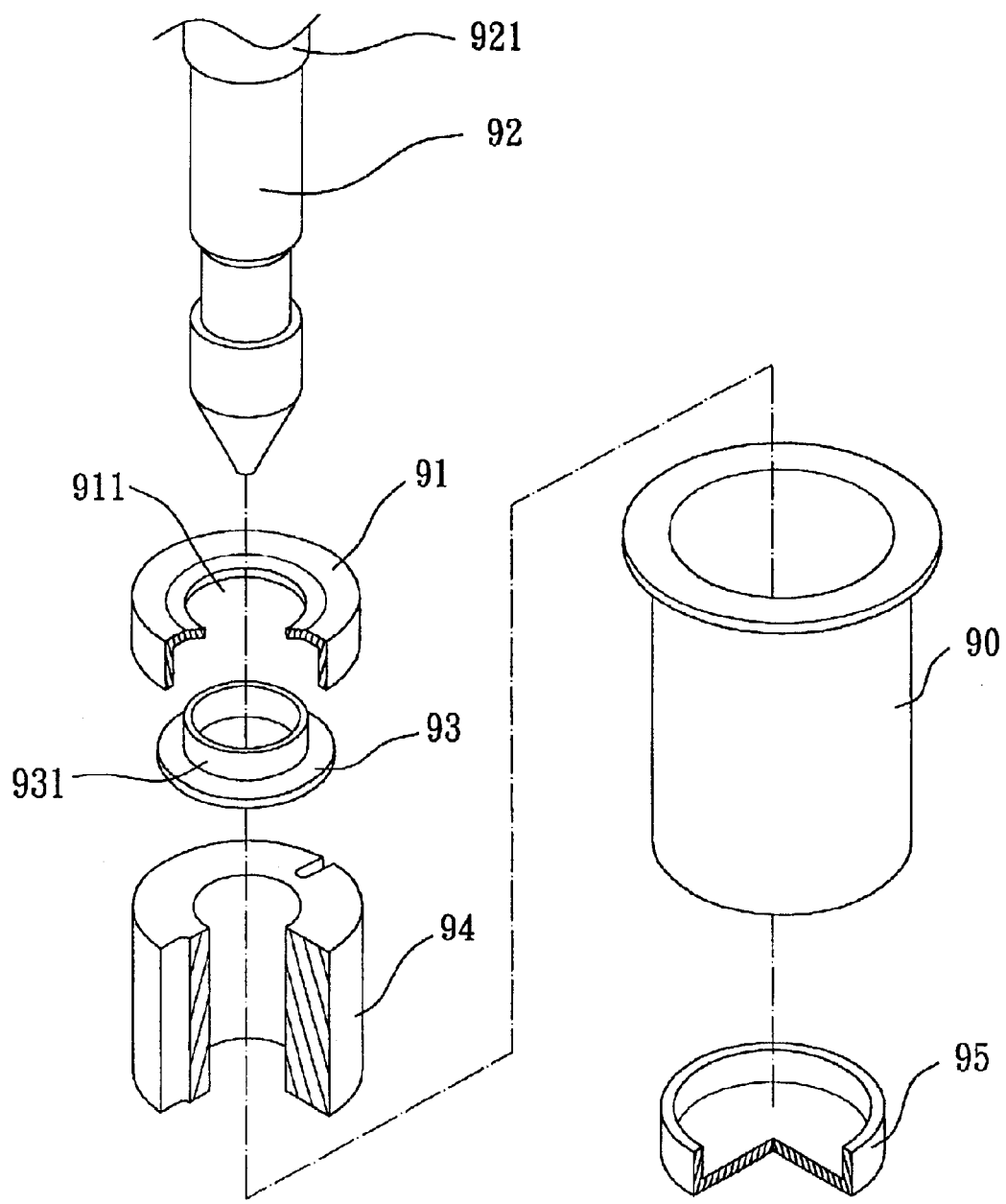
FIG. 7 is an exploded perspective view, partly cutaway, of a conventional bearing structure of a motor.
Figure 8:
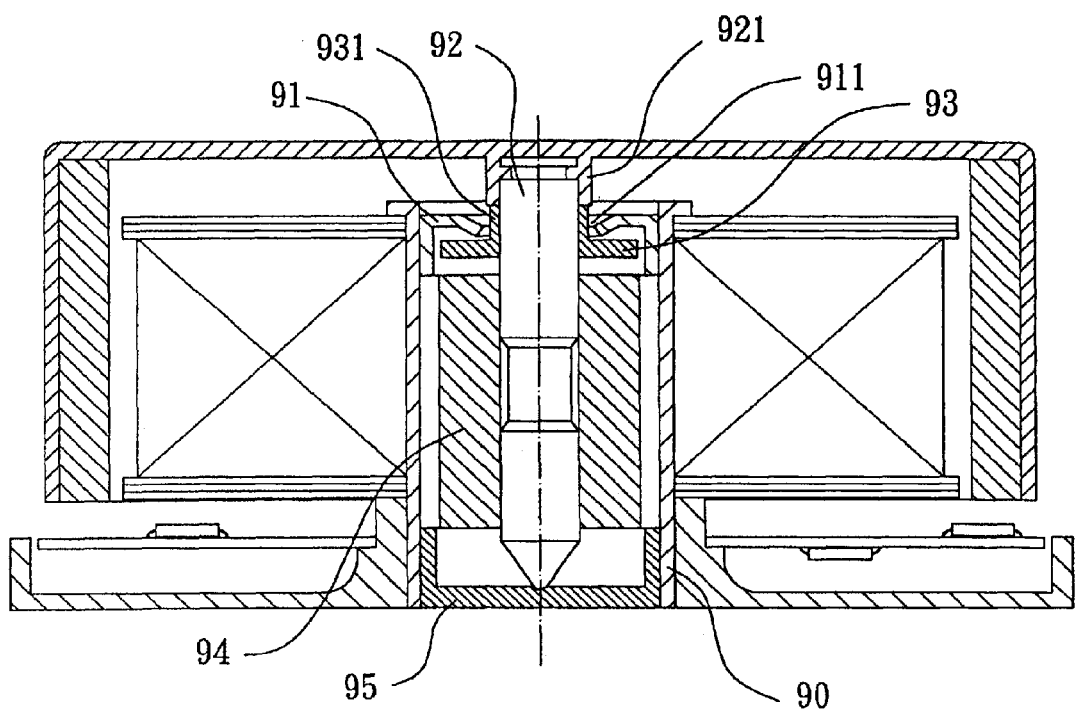
FIG. 8 is a sectional view of the motor in FIG. 7.
Figure 9:
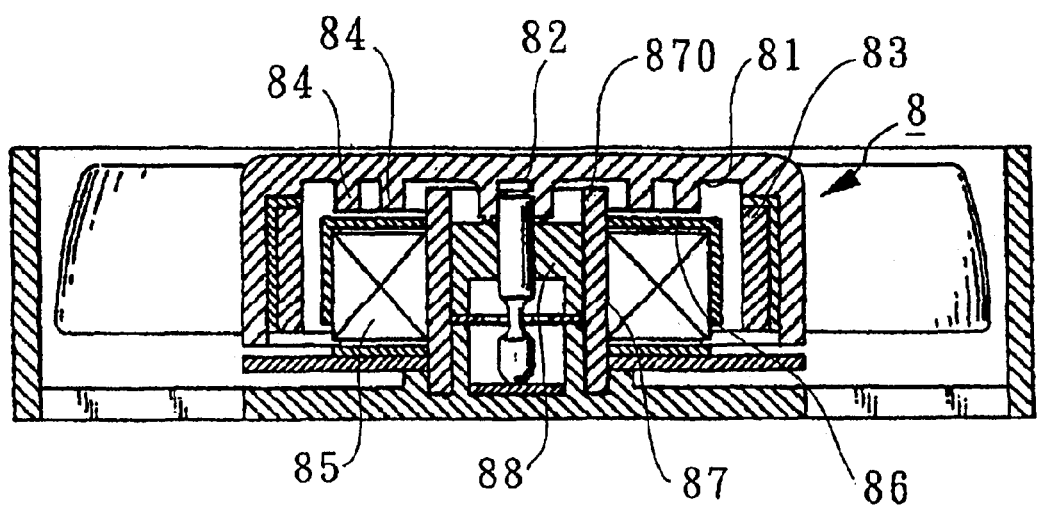
FIG. 9 is a sectional view of a conventional heat-dissipating fan.

Referring to FIGS. 5 and 6, in assembly, the stator 31 is mounted around the axle tube 3, and the oily bearing 34 is mounted in the hole 33 of the axle tube 3 with two ends of the oily bearing 34 being retained in place by means of respectively being abutted against by the support 35 and the retaining ring 36. The retaining ring 36 extends beyond the axle tube 3. The shaft 22 of the rotor 2 is rotatably held by the oily bearing 34. The retainer 23 is engaged in the annular groove 221 of the shaft 22 with the distal end of the shaft 22 being rotatably supported by the support 35. The inner annular wall 25 of the rotor 2 extends into the gap 37 between the reduced section 341 of the oily bearing 34 and the axle tube 3. The outer annular wall 26 of the rotor 2 is located around the axle tube 3 and extends to a position adjacent to an upper side of the stator 31. An upper end of the retaining ring 36 is located in the compartment 27 between the inner annular wall 25 and the outer annular wall 26.

By such an arrangement, dust or impurities could not enter the axle tube 3, as they would be blocked by the outer annular wall 26 of the rotor 2 and the retaining ring 36. Further, entrance of the dust or impurities is prevented by the arrangement of the inner annular wall 25 located in the gap 37 between the reduced section 341 of the oily bearing 34 and the axle tube 3. Even if the dust or impurities enter the axle tube 3 through the barrier from the outer annular wall 26 of the rotor 2, the retaining ring 36, and the inner annular wall 25 of the rotor 2, the dust or impurities can only be accumulated in the gap 37 between the reduced section 341 of the oily bearing 34 and the axle tube 3, rather than entering the space between the oily bearing 34 and the shaft 22. Further, the lubricating oil in the oily bearing released during rotation of the shaft 22 is blocked by the inner annular wall 25 and the retaining ring 36 and thus falls on the oily bearing 34 and then enters an interior of the oily bearing 34 through capillaries of the oil bearing 34. If necessary, a conventional lubricating oil passage may be provided in an outer periphery of the oily bearing 34 to allow flowing of the lubricating oil back to a space between a bottom of the oily bearing 34 and the support 35.

It is noted that the term "bearing" used herein is not limited to the oily bearing. Instead, the term "bearing" includes any member that is capable of rotatably receiving or holding the shaft 22. Further, the inner annular wall 25 may not be limited to extend from the outer periphery of the shaft base 21. The inner annular wall 25 can be formed in any position surrounding the shaft 22 of the rotor 2.

The dustproof bearing structure for a motor in accordance with the present invention may effectively prevent entrance of dust or impurities into the space between the shaft and the oily bearing 14, 34 while preventing loss of the lubricating oil of the oily bearing by means of provision of the inner annular wall 25 and the outer annular wall 26 on the rotor 2 and/or the retaining ring 36 fixed to an inner periphery of the axle tube 3. Thus, the life of the oily bearing is lengthened.

Although the invention has been explained in relation to its preferred embodiment, it is to be understood that many other possible modifications and variations can be made without departing from the scope of the invention as hereinafter claimed.

What is claimed is:

1. A motor comprising:

an axle tube including a hole, a stator being mounted to an outer periphery of the axle tube;

a rotor including an end wall having a shaft base, a shaft extending from the shaft base, an annular wall extending from an inner face of the shaft base and surrounding the shaft, a bearing member mounted in the hole of the axle tube, the bearing member rotatably receiving the shaft of the rotor and including a reduced diameter section, wherein the gap extends between the reduced diameter section of the bearing member and the axle tube, and wherein the annular wall of said rotor axially extends into the gap and is rotatable therin.

2. The motor as claimed in claim 1, wherein the rotor further includes an outer annular wall extending from the inner face of the shaft base and surrounding the annular wall, thereby providing a compartment between the annular wall and the outer annular wall, the outer annular wall surrounding the axle tube.

3. The motor as claimed in claim 2, wherein the outer annular wall extends to a position adjacent to an upper side of the stator.

4. The motor as claimed in claim 2, wherein the axle tube includes a flange on an upper end thereof, the flange being located in the compartment between the annular wall and the outer annular wall.

5. The motor as claimed in claim 1, wherein the bearing member is an oily bearing, and further comprising a retaining ring mounted in the axle tube and including a first end extending beyond the axle tube and a second end abutting against the oily bearing.

6. The motor as claimed in claim 5, wherein the annular wall is located between the reduced diameter section of the bearing member and the retaining ring.

7. The motor as claimed in claim 1, wherein the annular wall extends along an outer periphery of the shaft base.

* * * * *